April 28, 1942.   T. SCHADEGG   2,281,458
MEAT AND VEGETABLE COOLING DEVICE
Filed Sept. 22, 1939   3 Sheets-Sheet 3

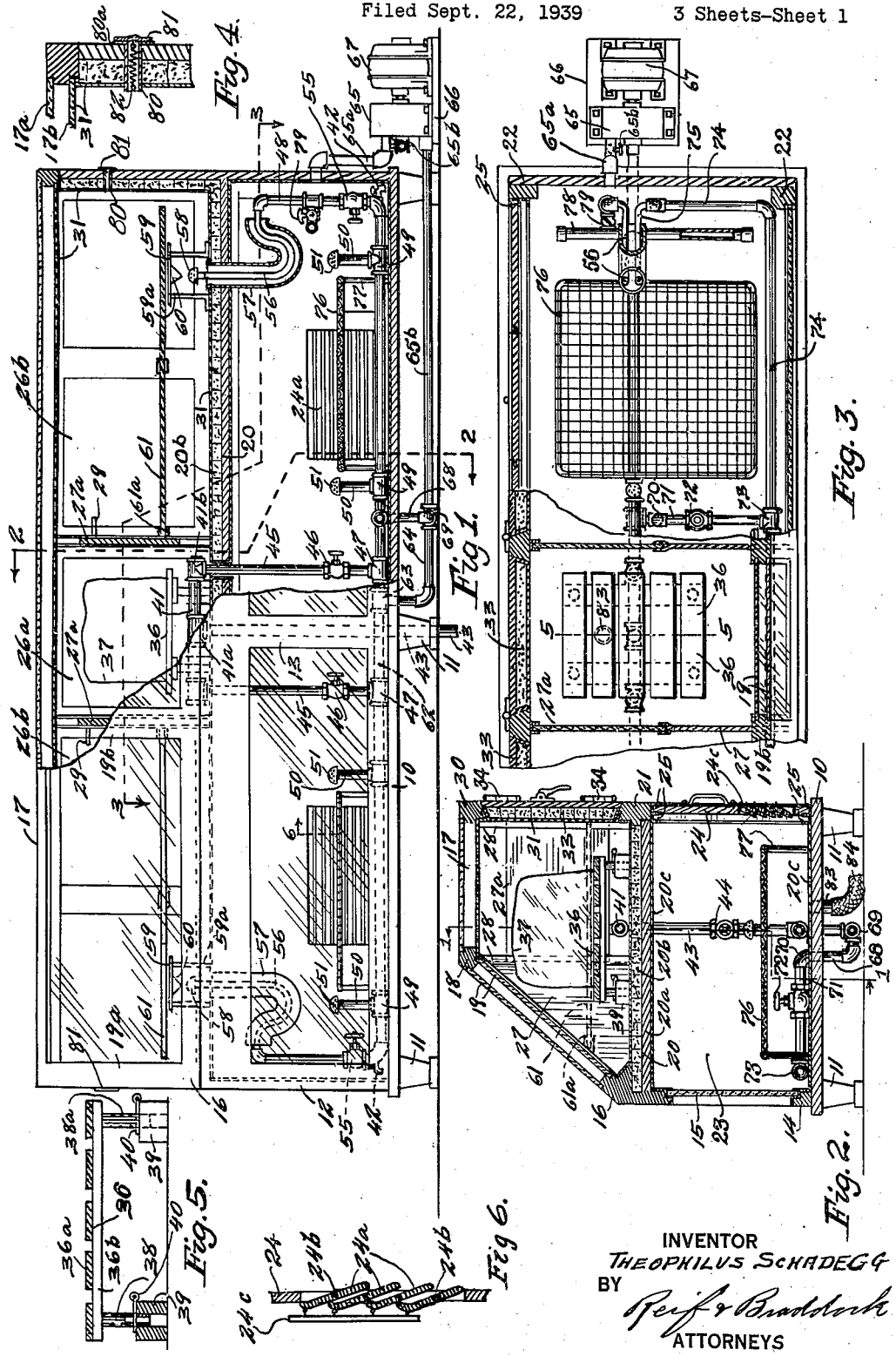

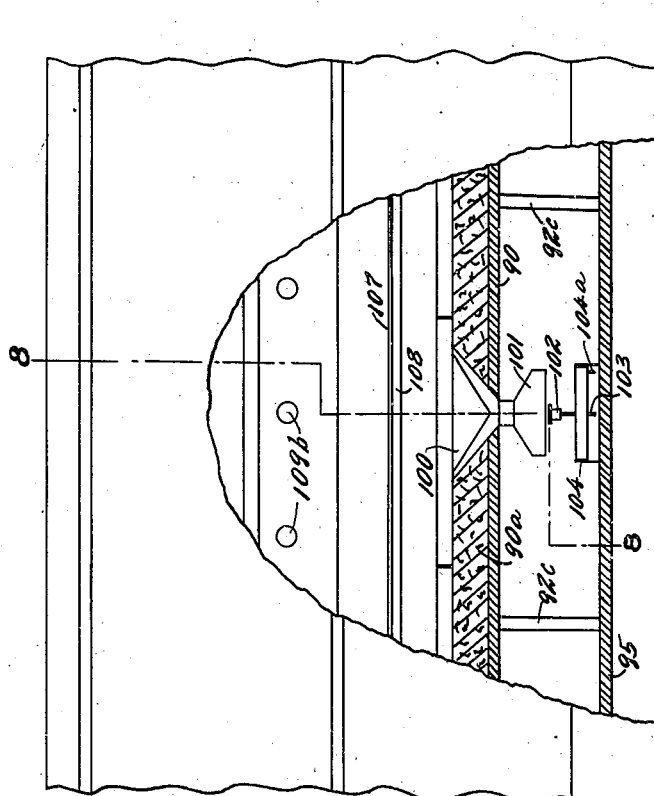
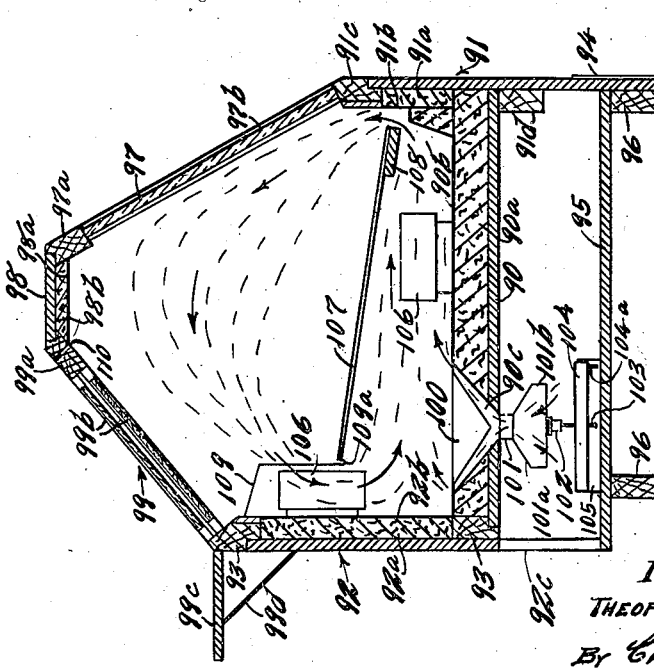

Inventor
THEOPHILUS SCHADEGG
By Chas. C. Reif.
Attorney.

Patented Apr. 28, 1942

2,281,458

UNITED STATES PATENT OFFICE 2,281,458

MEAT AND VEGETABLE COOLING DEVICE

Theophilus Schadegg, Minneapolis, Minn.

Application September 22, 1939, Serial No. 296,168

29 Claims. (Cl. 62—37)

This invention relates to a cooling device and particularly to such a device in the form of a cabinet or case adapted to contain food products and in which said products may be cooled and preserved in desirable condition. It is now common practice for storekeepers to have display cases in which meats, vegetables and other food materials are disposed and displayed. Such cabinets usually contain some cooling or refrigerating means. It has been found that with a great many of these cabinets the humidity becomes low and the meat and vegetables dry out to a considerable degree. It has also been found that the air in the cabinets is very apt to become foul and to have an odor. It is desirable, of course, to have a cabinet in which the meat, vegetables and other food products will be kept in fresh, moist and natural condition and one in which the air will be kept fresh and have the desired degree of humidity.

It is an object of this invention, therefore, to provide a cooling cabinet, case or counter having a chamber therein, a cooling means in said chamber and means for supplying the desired degree of humidity in keeping the air in fresh and sanitary condition.

It is a further object of the invention to provide a cooling device comprising a casing with a chamber therein, said chamber having an insulated bottom with an opening therethrough, preferably substantially in the form of an inverted cone, a member disposed in said opening and made of a material forming a good conductor of heat, said member preferably being in the form of an inverted cone and spaced from the walls of said opening whereby a passage is formed thereabout, together with means for projecting a spray of liquid upwardly into said opening and inducing a current of air upwardly through said opening and passage.

It is still another object of the invention to provide a device such as set forth in the above paragraph, a hood being secured to said bottom having its upper end surrounding said opening, said hood flaring downwardly having an open lower end and preferably provided with a vertical flange at its lower end, the means for projecting liquid upwardly being disposed below said hood.

It is still another object of the invention to provide a cooling device comprising a casing having a chamber therein, said casing having front and rear walls and a bottom, a partition extending transversely of said casing having its ends spaced from said front and rear walls respectively and inclined downwardly toward one end, a cooling means in said chamber between said partition and said bottom, said bottom having an opening therethrough and means for projecting liquid upwardly into said opening and inducing a current of air upwardly through said opening, said air passing upwardly between the lower end of said partition and one wall of said casing and passing downwardly between the upper end of said partition and the other wall of said casing.

It is another object of the invention to provide a cabinet of simple and inexpensive construction in which meats and vegetables may be kept and displayed, together with a simple and efficient means for maintaining the desired degree of humidity in said cabinet.

It is a further object of the invention to provide a cabinet having an upper compartment with insulated walls, means for maintaining said compartment at a low temperature, said cabinet having a lower compartment arranged to be kept at considerably higher temperature and which has means for spraying liquid therein.

It is a further object of the invention to provide a device for containing, displaying and cooling meats, vegetables and other food products, comprising a cabinet having upper and lower chambers, said cabinet preferably having a glass front, said upper chamber having refrigerating means therein, a liquid container adjacent said refrigerating means and means for conducting liquid from said container and spraying the same in said lower cabinet as well as said upper cabinet.

It is still another object of the invention to provide a device for containing, displaying and cooling meats and vegetables, comprising a cabinet having an insulated upper chamber with a plurality of compartments, a lower chamber adapted to be kept at a considerably higher temperature, a refrigerating means in one of the compartments of the upper chamber, a water container adjacent said means adapted to be cooled thereby, a conduit leading from said container extending into said lower chamber, atomizing means for the upper chamber connected to said conduit, said upper chamber having a liquid receiving means extending downwardly from its bottom through which said conduit passes.

It is still another object of the invention to provide a device for containing meat, vegetables and other food products, comprising a cabinet having an upper insulated chamber, refrigerating means in said upper chamber and means for directing air into said upper chamber.

These and other objects and advantages of the invention will be fully set forth in the following description made in connection with the accompanying drawings, in which like reference characters refer to similar parts throughout the several views and in which:

Fig. 1 is a view partly in front elevation of the device and partly in vertical section on line 1—1 of Fig. 2 as indicated by the arrows;

Fig. 2 is a vertical section taken on line 2—2 of Fig. 1;

Fig. 3 is a horizontal section taken on line 3—3 of Fig. 1;

Fig. 4 is an enlarged partial vertical section showing an exhaust valve used;

Fig. 5 is a vertical section on line 5—5 of Fig. 3, illustrating the support for the refrigerant;

Fig. 6 is a vertical section on line 6—6 of Fig. 1;

Fig. 7 is a partial view in front elevation of a modification, certain parts being broken away and others shown in vertical section;

Fig. 8 is a vertical section taken on line 8—8 of Fig. 7; and

Figure 9:
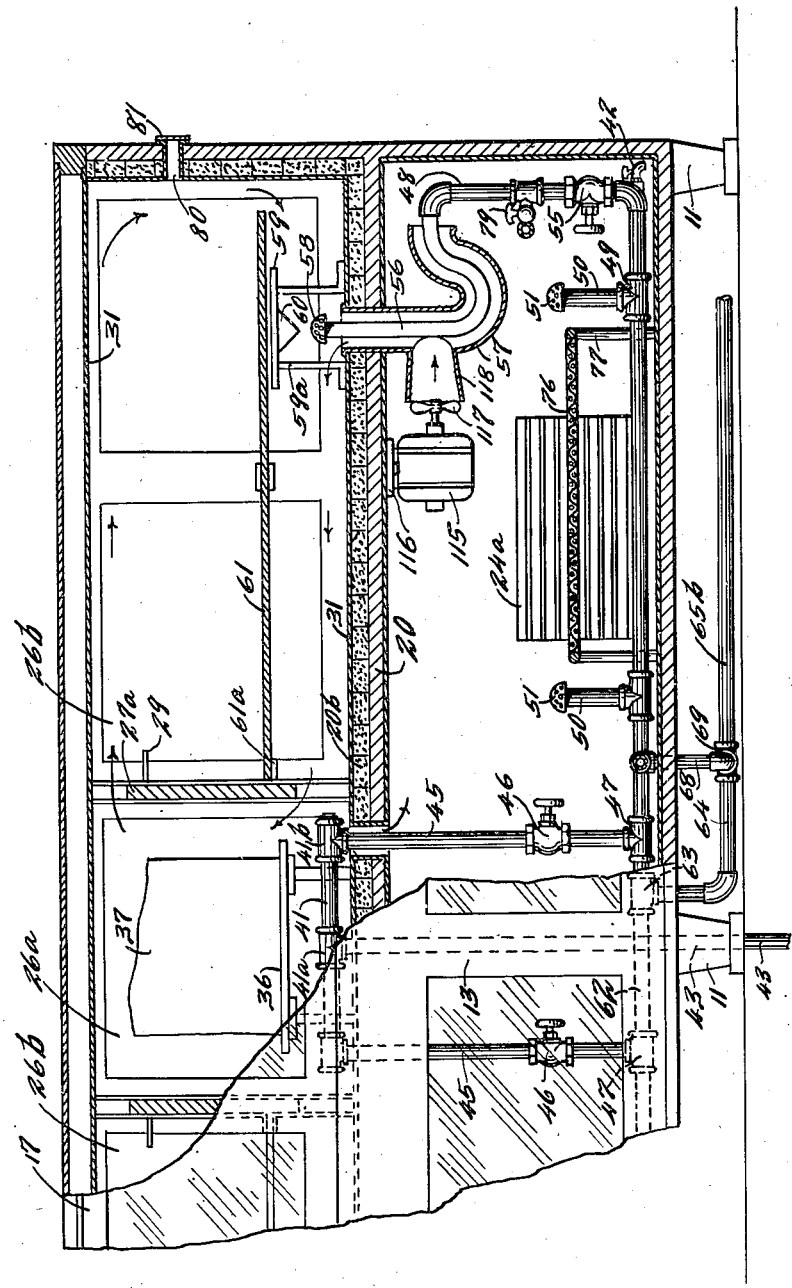
Fig. 9 is a view similar to Fig. 1 showing a modified form of the device.

Referring to the drawings, a cabinet is shown having a lower portion rectangular in horizontal and vertical cross section, the same having a base portion 10 supported upon six legs 11 disposed at the corners of said base portion. Said base portion has front corner posts 12 extending upwardly therefrom and a central front post 13. A longitudinally extending front portion or corner strip 14 extends along the front and glass plates 15 are supported in suitably rabbeted portions of members 12 and 14. The glass plates 15 are also disposed in a rabbeted portion of a central dividing strip 16 extending across the front of the cabinet above the strip 14. The cabinet above the lower rectangular portion is trapezoidal in shape, the rear portion of the cabinet being vertical and the front portion from strip 16 to the top 17 sloping upwardly and rearwardly. A front corner strip 18 is provided and said strip together with strips 16 are rabbeted at their inner and outer sides to form receiving portions for the glass plates 19 which are spaced and parallel and thus form a double glass front. A dividing wall or partition 20 separates the chamber in the lower rectangular portion from the chamber in the upper trapezoidal portion of the cabinet. Wall 20 extends from the front strip 16 to the rear strip 21 which extends between rear corner posts 22 of the cabinet. The partition 20 includes a layer of boards or sheathing 20a, a layer of cork or other suitable insulation 20b and the metallic layer 20c of galvanized metal or similar material with which the lower chamber 23 is lined, said metal 20c extending along the bottom of said chamber on the base member 10 and at the ends of the lower chamber as shown at the right in Fig. 1. The chamber 23 at its rear is closed by a pair of sliding doors 24 which move in channels 25 formed in the metal lining 20c at the top and bottom of said chamber, said channels 25 also facing inwardly at the ends of chamber 23 so that said doors are tightly closed at the ends. The doors 24 which slide in channels 25 are in different planes, so that they slide past each other toward the center of the cabinet. Each of the doors 24 are provided with a plurality of swinging shutters 24a mounted in openings in the doors on the pivots 24b. These shutters slope toward the inside of the cabinet so that any moisture will drain inwardly. They are connected at their outer sides by a rod 24c loosely pivoted thereto so that they can be swung in unison to permit more or less air to enter the cabinet or to close off air entirely. The upper chamber 26 of the cabinet is divided by a pair of partitions 27 into a central chamber 26a and chambers 26b at each side thereof. The glass plates 19 extend from the end corner pieces to the intermediate pieces 19b. The pieces or strips 19a and 19b extend from the strip 16 to the strip 18. There are thus three sets of the plates or panes 19, one in front of each of the chambers 26a and 26b. Partitions 27 comprise portions 27a which are slidable in channel guideways 28, one set being disposed at the rear of the cabinet and the other disposed vertically, extending downwardly from strip 18 and forming edges of the stationary triangular portions of partitions 27. The partition portions 27a are of rectangular shape as shown in Fig. 2 and the same can be moved vertically and held in different positions by pins 29 extending through the guideways 28 and into holes in the partitions 27. The top wall 17 of the cabinet extends from the front strip 18 to the rear top strip 30 and also comprises an upper plate or pane of glass 17a and an inner plate or pane 17b received in the front and rear strips 18 and 30. The upper chamber has an inside layer or lining 31. Lining 31 is of sheet metal and preferably of enameled metal and this lining extends along the ends of the upper chamber and along the bottom thereof and to the openings 32 in the rear of the upper chamber 26. There are two openings as shown in Fig. 1 for each chamber 26b and one opening for the central chamber 26a, making five in all and these openings are closed by insulated doors 33 hinged at one side by hinges 34 and having handle and latch members 35 at their other sides. Doors 33 also comprise an outer layer of metal or board, an intermediate layer of cork or similar insulation and an inside lining of enameled metal. Disposed within the central chamber adjacent the bottom thereof is a supporting frame or platform 36 adapted to support a block or cake 37 of refrigerating material such as ice or the now well known frozen carbon dioxide. Supporting means 36 comprises a plurality of spaced slats 36a carried on a pair of cross slats 36b to which are secured vertically extending posts 38. The posts 38 are received in similarly shaped apertures in blocks 39 supported on the floor 31 and said posts 38 can be held in different vertical positions in blocks 39 by pins 40 engaging in holes 38a in said posts.

A liquid container 41 is disposed in the chamber 26a beneath the support 36 and while this container may be of various forms, in the embodiment of the invention illustrated it is shown as in the form of a pipe having a central T 41a therein, having a reduced central and downwardly extending branch in which is secured a pipe 43 extending downwardly through chamber 23 and out through the bottom of the cabinet, which pipe 43 is adapted to be connected to a source of supply of water under pressure such as the city mains. Pipe 43 has therein a shut-off valve 44. Pipe 41 has T's 41b at its ends, the outer ends of which are plugged and the central outlets of which are directed downwardly and into which are secured respectively downwardly extending pipes 45 having shut-off valves 46 therein, said pipes 45 having at their lower ends T's 47 from which leads in opposite directions, pipes 48 disposed substantially along the bottom 20c of chamber 23. Pipes 48 have T's 49 therein having their central outlets directed upwardly to which are secured the vertically extending short pipes or nipples 50 having atomizing nozzles 51 at their upper ends. As shown in Fig. 1, two of the said nozzles 51 are shown at each end of chamber 23, or four in all. Pipes 48 extend beyond the T's 49 and have petcocks 42 in the ends thereof forming a drain. The pipes 48 extend substantially to the ends of chamber 23 and then extend upwardly having therein shut-off valves 55. Said pipes then extend horizontally and vertically and have reduction members at their ends by which they are connected to small copper pipes 56. The upper chambers 26b have at their end portions openings leading downwardly through partition 20 through which extend the upper portions respectively of trap members 57 having flanges at their upper ends extending outwardly over the bottom plate 31. Trap members 57 extend downwardly into chamber 23, are reversely curved and then extend laterally having open ends as clearly shown in Fig. 1. The pipe 56 extends through the trap member 57 and out at said open end where it is connected to pipe 48 and said pipe 56 has at its other end the upwardly directed atomizing nozzle 58. A short distance above nozzle 58 is a flat deflecting member or hood 59, the same having secured to its under side and centrally thereof a downwardly extending inverted conical member 60 coaxial with nozzle 58. As shown in Fig. 1 the cones 60 have continuous or unbroken surfaces and are secured to member 59 at their bases. Deflector 59 is supported upon a plurality of spaced narrow upstanding strips 59a, preferably three in number. A plate 61 preferably of glass is disposed in each chamber 26b and extends from the inner glass 19 to the rear of the chamber and from partition 27 to within a short distance of the end wall. Said plate preferably has thereon a rubber strip 61a engaging the glass 19 and a similar strip 61a engaging partition 27 to make a substantially air-tight joint. Plate 61 extends just over the top of deflector 59.

A pipe 62 extends between the T 47 and this is connected by a suitable T 63 to a pipe 64 extending through the bottom of the cabinet and to an air compressor 65 disposed upon a suitable base 66 at one end of the cabinet and driven by a suitable electric motor 67 to which it is shown as directly connected. Compressor 65 has an intake pipe 65a communicating with the lower chamber in the cabinet. A discharge pipe 65b leads from compressor 65 to T 69. Another pipe 68 extends from the T 69 in pipe 62 and through the bottom of the cabinet to an elbow 70 from which leads pipe 71 having therein a shut-off valve 72 and pipe 71 is connected by the T 73 to a pipe 74 extending along the floor of the lower chamber to a point adjacent the ends, said pipe then extending upwardly and being connected by a suitable coupling to another pipe 75 preferably of copper, which also extends into a trap 57 alongside of pipe 56, said pipe 75 having an open upper end extending slightly above the metal bottom of the upper chamber 26b. It will be understood that pipe 74 extends the full length of the chamber so that there is a pipe 75 in each of the traps 57 to which it is connected.

The lower chamber has disposed therein at each side and between the pipes 50 and nozzles 51, a foraminous tray 76 supported upon legs 77. A pipe 78 extends transversely in the lower chamber adjacent an end thereof and is connected by a short pipe to pipe 48, a shut-off valve 79 being disposed in the connecting pipe. The pipe 78 has a series of holes on the side adjacent tray 76 so that water can be sprayed therethrough over the tray 76.

The upper chambers 26b have openings through their end walls in which is fitted a small thimble 80 having a flange 80a at its outer end engaging the outside wall, which flange is engaged by the diaphragm 81 preferably circular in shape and tightly fitting against flange 80a. Diaphragm 81 may have a rubber ring thereon (not shown) for engaging flange 80a. Member 81 is held against member 80a by a tensile coiled spring 82 secured centrally to member 81 and secured to the inner side of the thimble 80. There is one of the thimbles 80 and the other parts in each end of the cabinet. A drain spout 83 is disposed at substantially the central portion of base member 10 extending through the metal floor 20c and a flexible hose 84 is connected to this drain spout so that liquid can drain from the bottom chamber and be carried to any suitable sewer or drain. The hose 84 can be removed if it is necessary to clean out the spout 83.

In operation a refrigerant such as ice or frozen carbon dioxide preferably in the form of a cake shown as 37 is placed upon the supporting platform 36. Water under pressure such as water from the city mains is delivered through pipe 43 and fills the container 41. The platform 36 is positioned at a height sufficient to give the desired cooling effect to container 41 and the liquid therein. The liquid in container 41 is cooled and passes down in pipes 45. When valves 46 are opened this liquid passes down the pipes 45 and part of the liquid or water passes through pipes 50 and is projected upwardly in a very fine mist by the atomizers 51. If valve 55 is open the liquid passes into pipe 56 and it is projected upwardly in a fine mist through the atomizer 58, this mist being directed downwardly by the deflector plate 59 and its deflector 60. The top chambers 26a and 26b are maintained at quite a low temperature which is suitable for the preservation of meat and chambers 26b are designed principally for meat or other products requiring the lower temperature. The water which is projected from atomizers 51 has been cooled and thus maintains a cool atmosphere in the lower chamber. This chamber can contain bottled goods on the floor thereof and fresh vegetables can be supported on the tray 76. The vegetables supported on the tray 76 can be sprayed with liquid from the pipe 78 when desired and this will clean the vegetables and also maintain them in a fresh condition. The liquid sprayed into the chambers 26b will collect on the metal bottom 31 and this is given a slight pitch toward the traps 57. The liquid therefore drains into traps 57 and will be retained in these traps in the lower portion thereof. This liquid is quite cool and pipe 56 will thus be kept at a rather low temperature. Water will, of course, collect in the traps until it runs out at the open end, which water will drip into the lower chamber and drain off of the floor thereof. It is desirable to have a circulation of air in the upper cooler chamber and this can be had by blowing air from the air compressor through pipe 62 into the pipes 48 and 56. At this time valves 46 will be closed. This air will pass into the chambers 26b through the atomizers 58 and will also pass into chamber 26a until sufficient pressure is produced to open valves 81. Air will then pass out of chamber 26a over partition 27a and over shelf 61 and out of valves 81. By providing the outlet valves, the air is replaced in chambers 26a and 26b and there is no opportunity for the air to become foul. Air can also be blown into the upper chamber without shutting off the atomizers 58 if desired by opening the valve 72 and blowing the air through pipes 74 and through the pipes 75 which also extend through the traps 57. This air will cause the same circulation as that already described. This circulation is maintained in the upper chamber without loss of refrigerating effect or appreciable drop in the temperature. This changes the air which will be washed by atomizers 51 before passing to the upper chamber. Air can be admitted to the lower chamber by opening the shutters 24a. Cool air may enter at the bottom of the shutters 24a and some warm air may pass out at the top of said shutters. As stated, the supporting member 36 is made adjustable so that the refrigerant can be brought closer to or further from the liquid container 41. If frozen carbon dioxide is used the temperature in container 41 can be kept quite low and the temperature in the chambers 26a and 26b can be kept quite low. The temperatures in these chambers can be maintained quite constant and in practice it has been found that the temperature will not vary more than two degrees. The water projected into the lower chamber will drain out through the drain 83 and any dirt which is washed from the vegetables will be drained out through spout 83. The members 81 are provided to form relief valves so that if the pressure in the upper chamber rises above one pound the spring 82 will be distended and the air can escape past the members 81. The air passing upward through conduits 57 into the chamber 26b is heavily supplied with moisture from the sprayer 58. This air passes upwardly and strikes against the surface of the cone 60 and plate 59 and later engages the under surface of plate 61. The engagement of the air with these surfaces causes a condensation of any excess moisture in the air for the temperature in casing 26b so that the air passes around the end of plate 61 into the chamber above plate 61 in substantially saturated condition.

Referring to Figs. 7 and 8, a modified form of cooling device is shown comprising a cabinet having a bottom wall 90 including a layer 90a of insulating material such as cork. The layer of cork 90a in turn is overlaid with a sheet 90b of metal suitably plated or galvanized or provided with a porcelain coat. Said casing has a front wall 91 also including a layer 91a of insulating material such as cork, a longitudinally extending member 91c and a metal covering 91b. Said casing also has a rear wall 92 including a layer 92a of insulating material and an inner layer 92b of metal suitably coated or plated. A longitudinally extending member or timber 91d is disposed in the corner formed by walls 90 and 91. Rear wall 92 also includes the longitudinally extending wooden members or timbers 93. The outer layer of the front wall extends downwardly to the floor and an additional baseboard or plate 94 extends along the front thereof. A platform 95 is provided some distance below bottom wall 90, the same being shown as supported upon longitudinally extending members or timbers 96. Spaced vertical supports 92c extend downwardly from rear wall 92 to platform 95. The casing also has an upwardly extending and rearwardly inclined front portion 97 comprising a longitudinally extending member 97a at its top and a transparent pane 97b. Said casing has a top wall 98 also comprising an insulated layer 98a and an inner metal lining 98b. Said casing has a rear top portion 99 extending between the upper member 93 and a longitudinally extending member or timber 99a, said rear portion having fitted therein longitudinally sliding doors 99b also preferably equipped with transparent panes. A shelf 99c extends rearwardly from the lower end of portion 99 in a substantially horizontal direction, the same having brace supports 99d. The bottom wall 90 has an opening 90c therethrough and while this might possibly be made of different shapes, in practice it has been found to be very efficient when made as illustrated in the form of an inverted frustum of a cone. A member 100 is disposed in opening 90c, the same being shown as in the form of an inverted hollow cone. Member 100 is a closed hermetically sealed member containing air or some other gas and will preferably be made of metal. The member 100 has its conical walls spaced from the wall of opening 90c so that an annular passage is provided about member 100, the same being shown as converging slightly at its upper end. A hood 101 of sheet material is provided having an upper cylindrical portion secured to bottom 90 and surrounding the lower end of opening 90c. Hood 101 flares downwardly as shown at 101a and has an open lower end surrounded by the substantially vertical cylindrical flange 101b. A nozzle 102 is provided disposed slightly below the bottom of flange 101b and coaxially with hood 101, the same having connected thereto a pipe 103 which will be connected to some source of water under pressure, such as the city mains. A drip pan 104 is disposed under hood 101, the same being shown as of rectangular shape in plan and supported upon legs 105. A drain pipe 104a leads from the bottom of pan 104 and will be connected to any suitable outlet. Cooling units 106 such as coils are disposed within the casing, one of these being shown as disposed just above the bottom 90 and the other being disposed some distance above the bottom and supported from the rear wall with which it is parallel.

A partition 107 is provided, the same being shown as inclining downwardly toward the front wall and supported at its lower end by a longitudinally extending member 108. Partition 107 is supported at its end by a bracket 109 made of sheet material and extending outwardly from front wall 102 and then downwardly to partition 107. The front part of bracket 109 is reversely bent as shown at 109a to form a small trough at the upper end of partition 107. While partition 107 may be made of any solid sheet material, in practice it has been made of sheet steel coated with porcelain. The front vertical portion of member 109 is also provided with a multiplicity of openings 109b and while these may take various shapes and be variously spaced, in the embodiment of the invention illustrated they are shown as circular. Vent openings 110 extend through the upper portion 99 and are shown as extending through member 99a at the extreme upper corner of the casing.

In operation a cooling medium will be supplied to the coils 106 in a manner well known in the art and the temperature within the casing will be brought to the desired point. This point, of course, will vary under different conditions and in accordance with the food kept in the casing but in practice with meat and vegetables a temperature of 38 degrees F. is often used. Water is supplied to pipes 103 and is sprayed upwardly in a fine spray from the nozzle 102. The member 100 which preferably is of metal will at its upper side have substantially the temperature of the chamber within the casing and this member being made of a metal which is a good conductor of heat will have a low temperature throughout. The liquid sprayed from nozzle 102 will engage the lower end of member 100 and this liquid will induce a current or flow of air upwardly through opening or passage 90c. The air and liquid striking member 100 will be cooled and any excess moisture in the air will be precipitated by the cold surface of member 100. The air will be cooled by its passage along the surface of member 100 and will pass into the chamber in substantially saturated condition. It has been found in practice that the hood 101 aids considerably in inducing a good flow of air into the casing. The air passes upwardly as indicated by the arrows between the lower end of partition 107 and the front wall. The air passes into the upper part of the chamber and descends adjacent the cooling unit 106, the same passing through the holes 109b. Some of the warmest air passes out through the vent openings 110. Fresh air is always being taken into the casing and this results in the air being kept in fresh and sanitary condition. The air taken into the casing is substantially saturated with moisture and this insures that the humidity will be held at a high point in the casing. The air in the casing is thus kept in the most desirable condition. Any moisture condensing on member 100 and the surplus moisture from the nozzle 102 will drip back into pan 104 and be carried off through the drain pipe 104a.

It will be noted that it is not necessary to have a fan for causing a circulation in the casing or counter. It has been found that ample movement of air is induced by the spray from nozzle 102. The fact that no fan is required makes it unnecessary to have a motor or other driving mechanism and there are thus no parts to require maintenance and which might eventually give trouble.

In Fig. 9 a modified form of the device is shown which will be quite similar to that shown in Figs. 1 to 6. In this form the motor 67 and compressor 65 together with the conduit 65a are omitted. Air is thus not forced into the cabinet from the exterior. To provide a circulation a motor 115 is provided which will be supported from a suitable bracket 116 secured to the under side of the partition 20. A fan 117 is secured to the shaft of motor 115 and discharges into the open end of a conduit 118 which extends from the side of and communicates with conduit 57. Air is thus directed from the lower chamber upward through conduit 57 into the chamber 26b. This air will be heavily charged with moisture from the nozzle 58 and will strike the cone 60 and plate 59. Moisture will be condensed on these parts and the air travel beneath plate 61 through the opening below partition 27a into the chamber 26a. This air will pass to the right as seen in Fig. 9 above partition 27a and can pass downwardly under plate 61 at the right hand end thereof. A circulation of cooled and humidified air is thus produced rising from beneath plate 61. The fan thus forms a means for so circulating the air in much the same manner that the hood 101b in Fig. 8 forms a means for circulating cooled and humidified air from beneath plate 107 upwardly to the upper portion of the cabinet and again downwardly at one side thereof. Air, of course, can pass to the lower chambers through the openings about pipes 45 in partition 20. A constant circulation of cooled and humidified air is thus insured throughout the chambers of the cabinet.

From the above description it is seen that applicant has provided a fairly simple and very efficient refrigerating and cooling cabinet. The humidity in the cabinet is kept at the desired degree by simple, novel and efficient means. The cabinet can be made and operated at much lower cost than the artificial refrigerating units now commonly used. At the same time chambers are provided having different chambers suited to the particular goods to be cooled and displayed. An air circulation is also provided in the cabinet which is highly desirable. The air circulated in the cabinet is taken from the lower chamber where it is washed by the atomizers and fresh air can be taken in as desired through the shutters in the rear doors. Vegetables supported on the trays 76 are kept in fine condition and will always appear fresh and clean. The circulation of the air in the device prevents odors being absorbed by one product from the other and the circulation of the air also keeps the meats in fresh condition. Moisture is supplied as needed and this acts to give the desired degree of humidity and at the same time acts to wash the air in the lower chamber. The articles in the cabinet are clearly visible through the front and top and the compartments or chambers in the cabinet are conveniently accessible through the doors at the rear. The cabinet is of pleasing appearance and makes a very desirable and efficient piece of apparatus for a grocery or a combined grocery and meat market. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

This application is a continuation in part of applicant's copending application S. N. 18,011, filed April 24, 1935.

What is claimed is:

1. A cooling device having in combination, a cabinet, a chamber in said cabinet having an insulating wall, means in said chamber for cooling the same, a passage through said wall, means for delivering moisture-laden air through said passage, means in said passage having a surface for condensing moisture from said air as it passes into said chamber and an outlet for air from said chamber whereby the air which has been supplied to said chamber can pass therefrom and a circulation of air thus provided to maintain a fresh atmosphere.

2. A cooling device having in combination, a cabinet, a chamber in said cabinet adapted to be cooled, said chamber having a wall with a passage therethrough, means for passing moisture-laden air through said passage and an inverted condensing cone disposed in and in axial relation to said passage against which said air is delivered substantially centrally thereof.

3. A cooling device having in combination, a casing having a chamber therein, a cooling means in said chamber, said casing having an insulated bottom having an opening therethrough in substantially the shape of an inverted frustum of a cone, a closed member in the form of an inverted cone, the same containing air and being air-tight disposed in said opening and spaced from the walls thereof and means for projecting saturated air upwardly into said chamber against and about said member.

4. A cooling device having in combination, a casing having upper and lower chambers, members in both chambers for supporting food material, means in said upper chamber for cooling the same, a passage leading from said lower chamber to said upper chamber, means for directing moisture laden air through said passage into said upper chamber and a member disposed in the path of said air and having a comparatively large surface exposed in said upper chamber so as to be cooled thereby whereby some of said moisture in said air will be precipitated and said air will enter said upper chamber substantially saturated.

5. A cooling device having in combination, a chamber, means within said chamber for cooling the same, means having a discharge portion for discharging moisture laden air into said chamber and a member extending transversely of and adjacent said discharge portion having a surface exposed in said chamber and cooled thereby and a surface against which said air is discharged to condense moisture therefrom as it enters said chamber.

6. A cooling cabinet having in combination, a chamber, means in said chamber for cooling the same, means having a discharge portion for discharging moisture-laden air into said chamber, means extending across said discharge portion and adjacent the same having a cool surface against which said air is discharged to condense moisture therefrom and an outlet means leading from said chamber.

7. A device for cooling and displaying meat, vegetables and other foods and beverages having in combination, a cabinet having upper and lower chambers therein, a refrigerant in said upper chamber, a liquid container in said upper chamber adjacent said refrigerant, means for conducting liquid from said container into said lower chamber and projecting the same therein in atomized form, an air compressor, a discharge conduit leading from said compressor and discharging air into said upper chamber, an intake conduit for said air compressor leading from said lower chamber and an additional means for supplying air to said air compressor from the atmosphere.

8. A cooling device having in combination, a chamber adapted to contain articles to be cooled having a bottom with an opening therethrough, a hermetically sealed metallic inverted cone containing heat insulating material disposed in said opening and means for projecting saturated air upwardly into said opening against said cone and into said chamber.

9. A cooling device having in combination, a chamber constructed and arranged for and intended to receive articles to be cooled, means in said chamber for cooling said chamber, means for projecting saturated air into said chamber and a baffling and condensing member of heat conducting material comprising a closed casing with a chamber therein against which said air strikes as it passes into said chamber.

10. A device for cooling and displaying meat, vegetables and other foods and beverages having in combination, a cabinet having upper and lower chambers therein, the upper one of said chambers having a refrigerant therein, a liquid container adjacent said refrigerant, a conduit connecting said chambers having an open end directed into said upper chamber, means for conducting liquid from said container and projecting the same in atomized form upwardly into said upper chamber and at said open end of said conduit and inducing a current of air through said conduit and means in said chambers for supporting said meat, vegetables and other foods and beverages.

11. A cooling and display device having in combination, a cabinet having a chamber therein, means in said chamber for cooling the same, said chamber having a bottom with a passage therethrough, means below said passage for directing a jet of liquid upward toward said passage and a baffling and condensing member in said passage cooled by said means whereby a current of saturated air is induced upward through said passage and the moisture therein is condensed by said member.

12. A cooling cabinet having in combination, a chamber, means in said chamber for cooling the same, a conduit leading from said chamber, means for delivering air into said chamber through said conduit, means axially alined with said last mentioned means for projecting a fine spray into said air and means in said cabinet against which said air is delivered for condensing excess moisture therefrom.

13. A cooling cabinet having in combination, a chamber, means in said chamber for cooling the same, a conduit leading into said chamber, means for projecting moisture-laden air into said chamber through said conduit and a hollow, closed, inverted cone axially alined with said passage against which said air is projected to condense moisture therefrom.

14. A cooling cabinet having in combination, a chamber, cooling means in said chamber, a substantially horizontal plate adjacent the bottom of said chamber for supporting articles to be cooled, means for projecting a spray of liquid vertically into said chamber below said plate, a conduit around said last mentioned means through which air is drawn into said chamber and an outlet for air leading from said chamber above said plate.

15. A device for cooling and displaying meat, vegetables and other foods and beverages having in combination, a cabinet having upper and lower chambers therein, means in said chambers for supporting food material, one of said chambers having insulating walls, means for supporting a refrigerant in said upper chamber, a liquid container adjacent said means, means for conducting the liquid from said container into the lower chamber and projecting said liquid therein in atomized form, means for delivering moisture-laden air into said upper chamber and means for admitting air to said lower chamber.

16. A device for cooling and displaying meat, vegetables and other foods and beverages having in combination, a cabinet having a central chamber and chambers at each side thereof, a refrigerating means in said central chamber, said chambers being separated by partitions spaced from the top and bottom thereof and means for holding said partitions at different heights.

17. A meat and vegetable holding device having in combination, a cabinet having an upper chamber and a lower chamber, a liquid container in said upper chamber, means for cooling the liquid in said container, means for supplying liquid to said container, a pair of pipes connected to said container and extending to substantially the bottom of said lower chamber and atomizers respectively connected to said pipes for projecting liquid upward in said lower chamber in the form of fine mist.

18. A device for cooling and displaying meat, vegetables and other foods and beverages having in combination, a cabinet having upper and lower chambers therein, said upper chamber having insulating walls, means for supporting a refrigerant in said upper chamber, a liquid container in said upper chamber adjacent said means, means for conducting liquid from said container into the lower chamber and projecting the same in atomized form and means for drawing air from said lower chamber and delivering the same to said upper chamber.

19. A cooling cabinet having in combination, a cabinet having a chamber therein, means in said chamber for cooling the same, a plate extending horizontally in said chamber adjacent the bottom thereof, a passage leading upwardly into said chamber below said plate, a liquid spray means axially alined with said passage below said plate and adapted to spray liquid toward said plate and move air through said passage and a member having a surface engaged by said air and liquid whereby air passing into said chamber through said passage is supplied with moisture and said moisture may be condensed on said plate and surface before passing to the chamber above said plate.

20. A cooling device having in combination, a cabinet having a chamber therein, means in said chamber for cooling the same, said chamber having an insulated bottom with an inverted frusto-conical opening therethrough, a closed casing in the form of a metallic inverted cone, containing a gas which is a non-conductor of heat and hermetically sealed disposed in said opening and forming a passage thereabout and means for directing a spray of water upwardly toward said cone to induce a current of moisture-laden air through said passage.

21. The structure set forth in claim 20, a hood secured to the bottom of said opening and flaring outwardly and downwardly therefrom, said spray being directed upwardly into said hood.

22. A cooling and display device having in combination, a cabinet having a chamber therein, means in said chamber for cooling the same, said cabinet having an insulating bottom with a comparatively large opening therethrough, means for directing a current of moisture-laden air upwardly through said opening substantially centrally thereof and a condensing member cooled by the air in said chamber disposed in said opening against which said air is directed and around which it passes into said chamber.

23. A cooling and display device having in combination, a cabinet having a chamber therein, a cooling means in said chamber for maintaining a comparatively low temperature therein, said chamber having an insulated wall with a comparatively large opening therethrough, a conduit extending from the outer side of said opening and having an open end remote from said opening, means for directing a spray of water, of considerable higher temperature than the temperature of said chamber, into the open end of said conduit toward said opening to induce a current of moisture-laden air through said opening and a condensing member disposed in said opening over and about which said air passes for removing excess moisture therefrom.

24. The structure set forth in claim 23, said opening being of inverted frusto-conical shape and said condensing member being of inverted conical shape so that a passage is formed thereabout through said opening.

25. The structure set forth in claim 23, said opening being of inverted frusto-conical shape and said condensing member being of inverted conical shape so that a passage is formed thereabout through said opening, said cone being made of metal and containing a gas which is a non-conductor of heat.

26. A cooling device having in combination, a cabinet having a chamber therein, means in said chamber for cooling the same, said chamber having an insulated bottom with an inverted frusto-conical opening therethrough, a metallic inverted cone disposed in said opening and forming a passage thereabout into said chamber, a hood having an upper portion connected to the lower end of said opening and having a downwardly directed open end of larger diameter than its upper end and means for projecting a fine jet of liquid under pressure upwardly into said hood and toward said cone whereby a current of air is induced to flow through said passage into said chamber.

27. A cooling and display device having in combination, a cabinet having a chamber therein, means in said chamber for cooling the same, said chamber having a bottom with a passage therethrough, means below said passage for directing a jet of liquid toward said passage, a baffle-like condensing member in said passage, a hollow member surrounding said jet extending to said passage and having an opening at its bottom whereby a current of air is induced to flow through said member and passage into said chamber.

28. A refrigerating device having in combination, a casing having a chamber therein, a plate in said chamber for supporting the articles to be refrigerated, said plate comprising the top of a second chamber therebelow, humidifying means disposed below said plate for supplying moistened air to said second chamber and means for causing a circulation of said moistened air from said second chamber to the upper portion of said first mentioned chamber.

29. A refrigerating device having in combination, a casing having a chamber therein, a plate in said chamber for supporting the articles to be refrigerated and forming the top of a second chamber, humidifying means for supplying moistened air to said second chamber, a cooling means in said second chamber and means for causing a circulation of said moistened air from beneath said plate to the upper portion of said first mentioned chamber.

THEOPHILUS SCHADEGG.